INVENTOR.
HAROLD D. DAIGH
BY
ATTORNEY.

INVENTOR.
HAROLD D. DAIGH
BY
Donald W Cana
ATTORNEY.

United States Patent Office 3,446,196
Patented May 27, 1969

3,446,196
FUEL GASIFIER SYSTEM
Harold D. Daigh, Rolling Hills Estate, Calif., assignor to Atlantic Richfield Company, Philadelphia, Pa., a corporation of Pennsylvania
Continuation-in-part of application Ser. No. 597,963, Nov. 30, 1966. This application Feb. 13, 1967, Ser. No. 615,445
Int. Cl. F02m 29/00
U.S. Cl. 123—119          13 Claims

ABSTRACT OF THE DISCLOSURE

This application relates to a novel fuel gasifier system for an internal combustion engine having a conduit for recycling exhaust gas into the induction system below the carburetor wherein fuel is inducted or pumped into the recycle gas distribution system for improved gasification of the fuel.

---

This application is a continuation-in-part application of application S.N. 597,963, filed Nov. 30, 1966, for "Fuel Gasifier System," now abandoned.

This invention relates to an improvement in internal combustion engines and more particularly relates to a system for gasifying at least a portion of the fuel fed to the combustion chambers in an internal combustion engine equipped for recycling exhaust gas into the induction system.

Fuel nebulization and vaporization in the induction system is an important factor in increasing the efficiency of internal combustion engine and reducing the content of carbon monoxide and unburned hydrocarbons in the exhaust emission. Under certain operating conditions the fuel charge is not properly nebulized and vaporized. For example, fuel inducted into the induction system through the idle jets tends to run down the inside of the carburetor throttle body in liquid form rather than nebulize and subsequently vaporize. A portion of the fuel from the idle jet may therefore not be fully utilized in the combustion process since it is not properly gasified prior to entering the combustion chamber. As used herein the expression "gasifying" refers to the process of nebulizing and subsequently vaporizing liquid fuel.

In the prior art, attempts have been made to heat the air-fuel mixture prior to its entry into the combustion chambers, for example, by passing the incoming air-fuel mixture over a heat riser to heat the air-fuel charge with a portion of the hot exhaust gas circulated through the heat riser, in order to improve gasification of the fuel in the air-fuel mixture. It has now been found that atomization of the fuel prior to such heating further improves gasification of the fuel and consequently tends to improve fuel economy and reduce hydrocarbon and carbon monoxide exhaust emissions. Accordingly, it is an object of the present invention to provide a means for gasifying fuel charged to the combustion chambers of the internal combustion engine.

It is a further object of my invention to provide a fuel gasification system which utilizes the exhaust gas recycle distribution system to effect gasification of fuel fed to the induction system of an internal combustion engine.

It is also an object of the present invention to gasify the idle fuel prior to inducting such fuel into the combustion chambers.

It is also an object of my present invention to provide an improved means for gasifying the idle, part-throttle and acceleration fuel supplied to an internal combustion engine.

It is still a further object of my present invention to provide a means for atomizing fuel inducted into an exhaust recycle distribution system prior to heating said fuel.

It is a further object of my present invention to provide a means for mixing air with fuel inducted into an exhaust recycle distribution system prior to heating said fuel.

Other objects and a more complete understanding of my present invention may be had by reference to the following specification when taken in conjunction with the appended claims and the drawings, wherein FIG. 1 shows, in partial section, an internal combustion engine employing an embodiment of my present invention;

Figure 6:
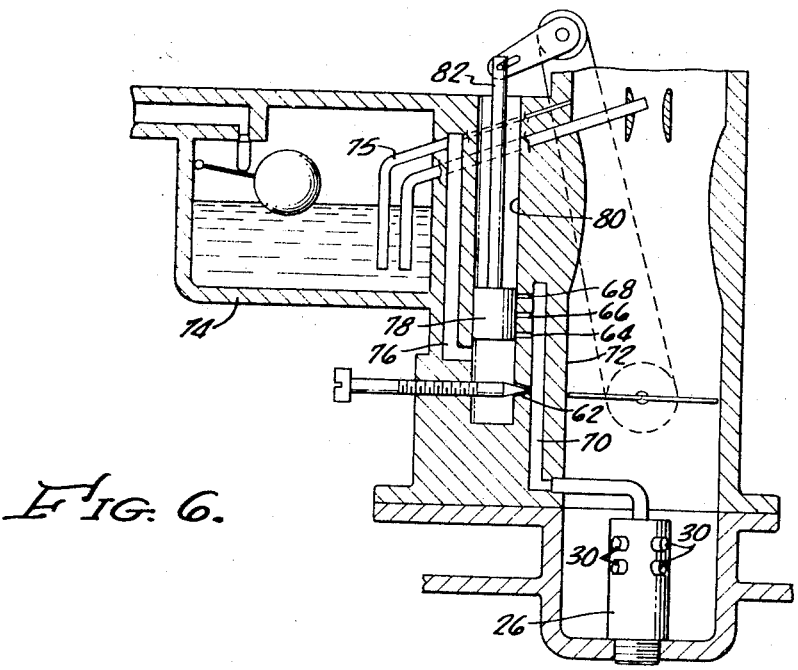
Figure 7:
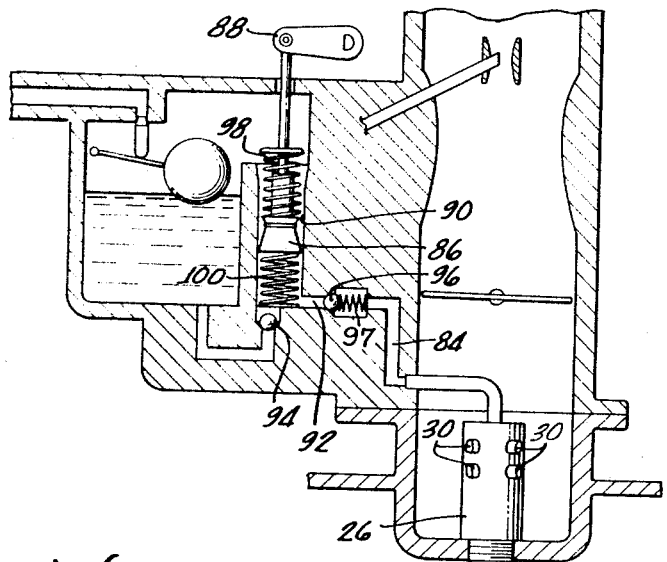
Figure 8:
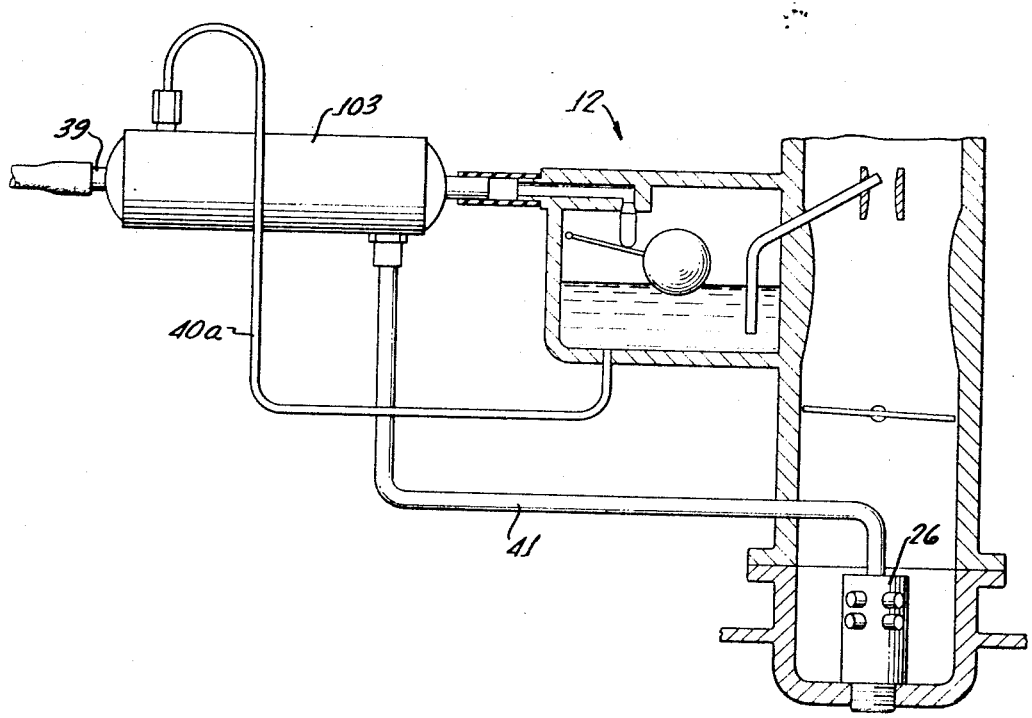
Figure 9:
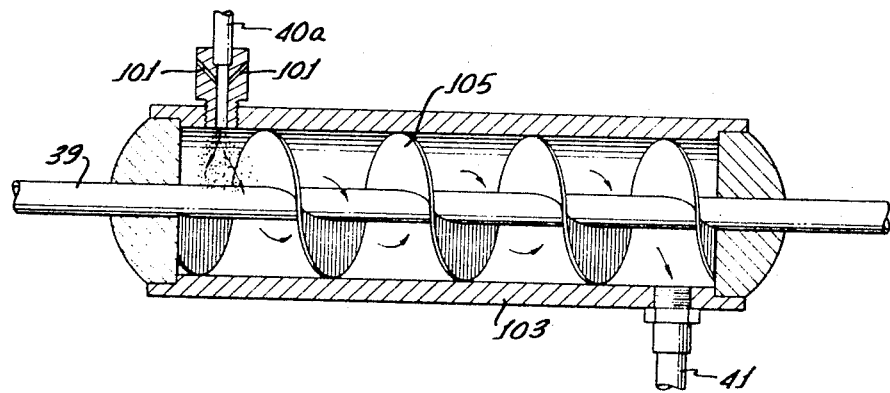

FIG. 6 is an enlarged sectional view showing another embodiment of my present invention with a modified arrangement for feeding the idle and off-idle fuel into the exhaust recycle distribution system; and FIG. 7 is a cross sectional view of yet another modification of my present invention employing the concept of my present invention to gasify fuel discharged into the induction system by an accelerator pump;

FIG. 8 shows, in partial section, a modified fuel feed system for an internal combustion engine employing my present invention;

FIG. 9 is an enlarged cross-sectional view of the idle fuel metering device shown in FIG. 8.

Briefly described, my present invention in its preferred form provides a means for gasifying at least a portion of the fuel charged into the combustion chambers, such as the idle fuel supply, by putting the fuel to be gasified into the exhaust recycle gas to preheat the fuel and effect improved gasification. In its best mode of operation, my invention involves conveying the idle fuel itno the exhaust gas recycle distribution system so that the idle fuel is mixed with the exhaust recycle gas and distributed through the individual tubes or passageways leading to the intake ports of the engine combustion chambers.

Figure 1:
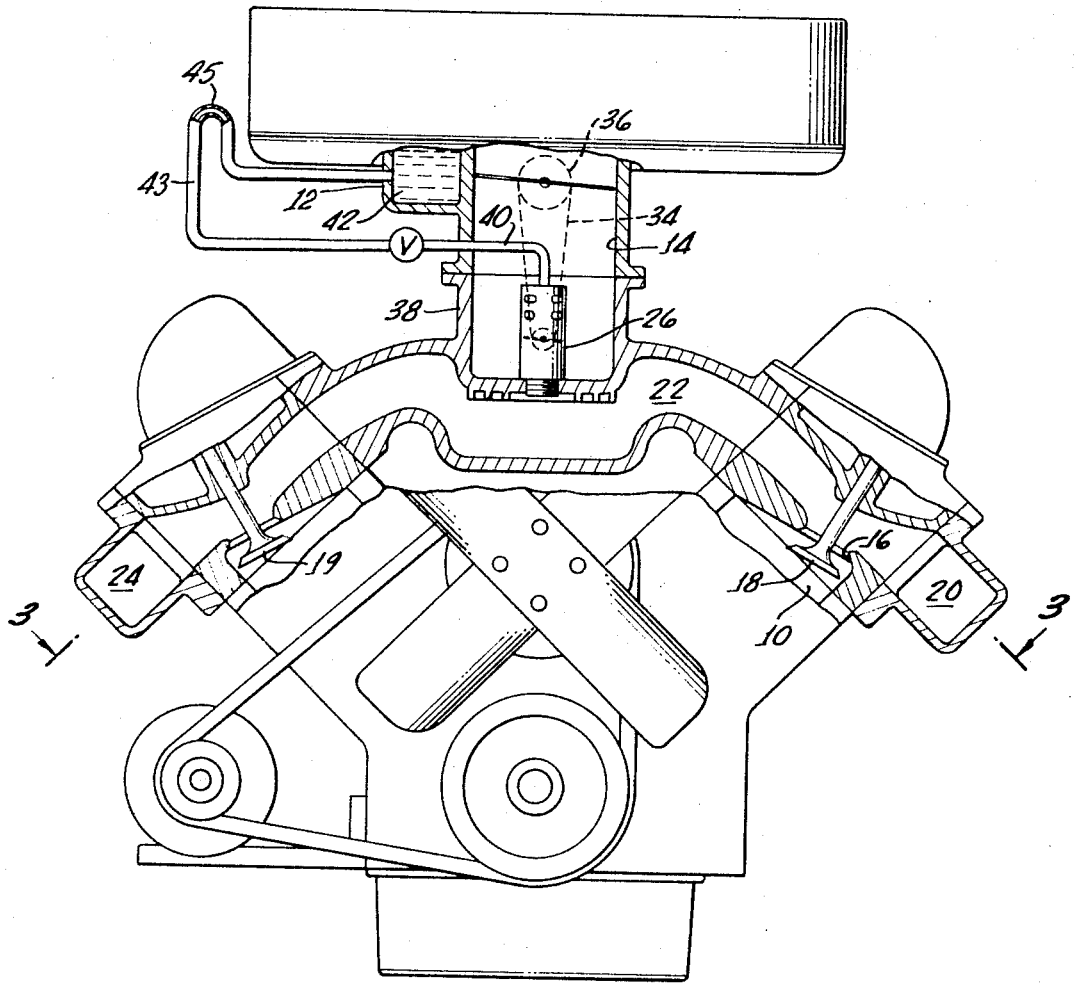
Figure 2:
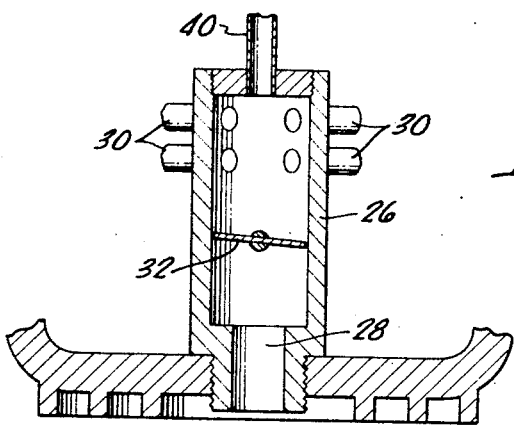
FIG. 2 shows an enlarged cross sectional view of an exhaust recycle valve body and distribution system which may be utilized in conjunction with my present invention.

Referring now more particularly to the drawings, FIG. 1 shows an exhaust recycle system of the type shown in my Patent No. 3,237,615 for "Exhaust Recycle System" issued Mar. 1, 1966. A conventional V–8 internal combustion engine having a combustion chamber 10 and a carburetor 12 is depicted. Fuel from the carburetor 12 passes through the throttle body 14 into the combustion chamber 10 through valved intake ports, not shown. The combination products are exhausted from the combustion chamber through the exhaust port 16 when exhaust valve 18 is opened as shown in FIG. 1 and the exhaust is removed through the exhaust manifold 20. A portion of the hot exhaust gas is passed through a heat riser 22 to preheat the incoming air-fuel mixture and equalize the exhaust pressure between the two exhaust manifolds 20 and 24. An exhaust gas distributor body 26 communicates with the heat riser 22 through port 28 (FIG. 2) so that a portion of the exhaust gas passing through the heat riser may be recycled into the induction system. In a preferred embodiment a portion of the hot exhaust gas passing through the heat riser 22 is conveyed through the distributor body 26 and thence through distribution tubes 30 and into the intake ports of the individual combustion chambers as taught in my aforementioned patent. The recycled gas is inducted into the distribution tubes 30 by the intake manifold vacuum and the flow of exhaust gas recycle is controlled by recycle control valve 32 which may be operated conjointly with the throttle valve accelerator mechanism as taught in my aforementioned patent or it may be operated conjointly with the carburetor throttle valve as shown in phantom line in FIG. 1, using a chain 34 mounted on sprocket 36 of the carburetor throttle valve and sprocket 38 of the recycle control valve.

A valved tube 40 connects the carburetor float bowl 42 with the distributor body 26 to convey the idle fuel from the float bowl directly into the exhaust recycle distribution system above the exhaust recycle valve 32. Line 40 extends to a point 43 above the bowl fuel level to prevent free gravitational flow of fuel and air bleed hole 45 prevents the syphoning of fuel through line 40.

Figure 3:
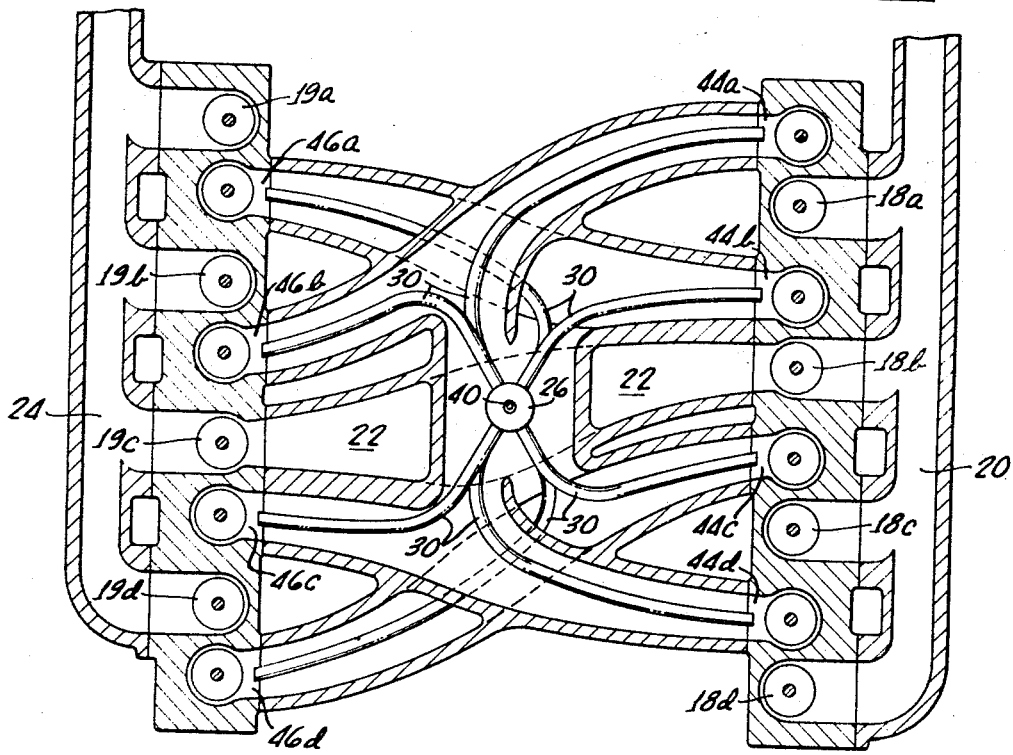
FIG. 3 is a sectional view of the internal combustion engine shown in FIG. 1 taken on line 3—3 of FIG. 1.

FIGURE 3 shows a plan view taken on line 3—3 through the heat riser area of FIG. 1 and shows the intake manifold and the exhaust manifold of the V-8 engine shown in FIG. 1. The heat riser 22 is shown in phantom line and extends between the exhaust manifolds 20 and 24 below the distributor body 26. The distribution tubes 30 direct recycle gas into each of the intake ports of FIG. 3, that is, ports 44a, 44b, 44c, 44d, and 46a, 46b, 46c, and 46d.

Exhaust gas from the heat riser section is inducted by the intake manifold vacuum into the recycle distribution system and into the intake ports through the distribution tubes 30. Idle fuel is normally conveyed into the combustion chambers by induction manifold vacuum. Since an engine employing an exhaust recycle system would inherently operate at a lower intake manifold vacuum because of the recycle opening into the heat riser, the intake of idle fuel through the idle and off-idle jets is less in my present system than in other systems not employing this form of idle fuel induction.

The fuel inducted into the exhaust recycle gas conduit through which the hot exhaust gases are recycled, is heated to thus aid gasification of the fuel prior to its induction into the combustion chamber. This gasification as aforementioned is desirable from the standpoint of economy and reduction of hydrocarbon and carbon monoxide exhaust emissions, as will be shown by operating data herebelow.

Figure 4:
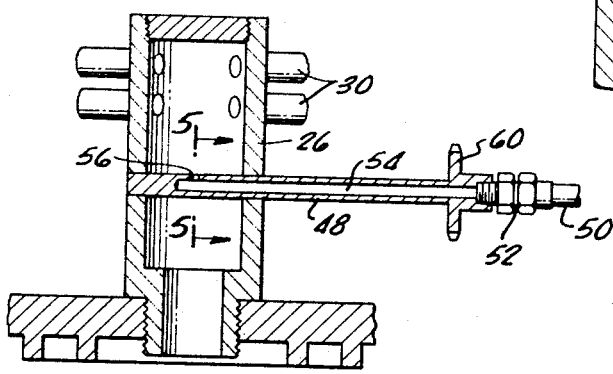
FIG. 4 is an enlarged cross sectional view of an exhaust recycle distribution system similar to that shown in FIG. 2 but modified in accordance with another embodiment of my present invention.
Figure 5:
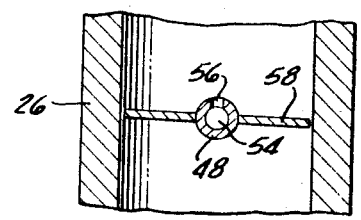
FIG. 5 is a sectional view taken along line 5—5 of FIG. 4.

FIGURES 4 and 5 show a modification of my present invention wherein the fuel is conveyed into the exhaust gas distribution system through the control valve shaft 48. A tube 50 from the carburetor float bowl is connected to the valve shaft 48 with a swivel 52 so that fuel may pass through a central opening 54 of the shaft into the distribution system through port 56 of the shaft which is located within the exhaust distributor body 26. Conjoint operation of the recycle valve 58 with the throttle valve may be accomplished by any suitable means, such as with a chain and sprocket arrangement utilizing a sprocket 60 on recycle shaft 48, or with the throttle valve accelerator mechanism described in Patent No. 3,237,615. Since the accelerator mechanism actuates the throttle valve, a conjoint operation with the accelerator mechanism would inherently be a conjoint operation with the throttle valve and hence a conjoint operation with the throttle valve could be either a conjoint operation with the throttle valve per se or the accelerator mechanism.

FIGURE 6 shows a section taken through a carburetor bowl and throttle body of a modified form of my present invention where in addition to the idle fuel, the off-idle or part-throttle fuel may be conveyed to the recycle distribution system. The idle jet 62 and the part-throttle or off-idle jets 64, 66, and 68 communicate with the passageway 70 rather than inner wall 72 of the throttle body. Idle fuel is fed from the carburetor bowl 74 through tube 75 and passageway 76 through the idle jet 62 and passageway 70 to the recycle distributor body 26. Piston 78 is vertically movable in the chamber 80 on a shaft 82 which is connected through appropriate linkage 82 to the throttle valve accelerator mechanism (not shown). Upward movement of piston 78 from its position shown in FIG. 6, as the accelerator pedal (not shown) is actuated, uncovers the various off-idle fuel jets 64, 66 and 68 to admit fuel into the passageway 70.

FIGURE 7 shows a form of my present invention where an accelerator pump pumps raw fuel into the exhaust recycle distribution system 26. The accelerator pump provides the extra fuel necessary to overcome the momentary leanness caused by a sudden change of throttle opening (i.e., during acceleration) which results in an immediate increase in air intake since the fuel, having greater weight, tends to lag behind. In the prior art, the accelerator pump discharged extra fuel into the venturi air stream whenever the throttle valve was opened. According to my present invention this fuel would be discharged through port 84 in the carburetor throat, to the recycle distribution system 26. The accelerator pump system utilizes a pump plunger 86 which is linked to the throttle lever by mechanical linkage 88. Any opening of the throttle valve causes the pump plunger 86 to move downwardly in the pump well 90. This action unseats ball valve 96 against the force of spring 97 and forces fuel through the pump passages 92 and into the port 84 and the recycle distribution system. The spring 97 is designed to resist opening by manifold vacuum through line 84. As the throttle is closed the pump plunger 86 is lifted up in the well, creating a low pressure below the plunger and inlet ball check valve 94 is lifted off its seat and allows fuel to flow into the pump well 90, while the discharge check valve 96 seats to prevent air from leaking into the discharge passage 92. The duration spring 98 and return spring 100 work together to give a controlled smooth discharge for a moment after the accelerator pedal (not shown) stops moving. By use of the apparatus shown in FIG. 7, raw fuel normally charged into the venturi air stream through the carburetor is charged into the exhaust recycle distribution system, where it can be gasified because of the increased heat at that portion of the system and thus more effectively be utilized as fuel.

In another modification of my present invention, the fuel drawn into the recycle distributor 26 is mixed or metered with air to improve fuel atomization and vaporization prior to admixture with the hot exhaust recycle in recycle distributor 26. An embodiment of this modification is shown in FIGS. 8 and 9. Any suitable air metering means may be used, for example, that shown in FIGS. 8 and 9 where in addition to air metering to improve atomization of the fuel, the fuel passing from the fuel tank to the carburetor bowl is cooled to prevent vapor lock and/or carburetor percolation. In FIG. 9, fuel flowing through line 40a is mixed with air drawn into the line through hole 101 by intake manifold vacuum through line. Air-fuel mixing is effected in a circulatory member 103 which is designed to enhance atomization of the fuel prior to its induction into the exhaust recycle distributor 26. FIG. 9 shows the internal helical vanes 105 of the circuatory member 103 as they encircle the fuel line 39 in a manner to cool the fuel pumped from the tank (not shown) to the carburetor 12.

As an example of my present invention, a 1966 Chevrolet with the systems shown in FIG. 1 was operated with the idle fuel inducted into the exhaust recycle distribution system. The exhaust emissions from the 1966 Chevrolet using this system contained 0.10 percent carbon monoxide at idle and 0.23 percent carbon monoxide through the entire California test cycle. The same automobile exhaust emissions without the use of the idle fuel distribution gasification system of my present invention contained about 1.5 percent carbon monoxide through the entire California test cycle.

The equipment shown in FIGS. 8 and 9 was operated with a 1966 Chevrolet 283 cubic inch V-8 engine with (Test 1) and without (Test 2) exhaust manifold air injection at about 20% exhaust recycle. The analysis of the exhaust emissions from this equipment when operated at California hot cycle conditions (Test Procedure For Vehicle Exhaust Emissions (current)—California Motor Vehicle Pollution Control Board) is shown in Table I. The corrected data represent corrections for air dilution in the sample collection equipment.

TABLE I

[Test 1 (with air injection)]

| | Bag | Corrected | 1966 California acceptable limits (Federal standards for 1968) |
|---|---|---|---|
| CO, percent | 0.60 | 0.90 | 1.5 |
| $CO_2$, percent | 9.55 | 14.3 | |
| HC, p.p.m | 112 | 168 | 275 |
| $NO_x$, p.p.m | 160 | 240 | 350 |

Correction factor 1.500.

[Test 2 (without air injection)]

| | Bag | Corrected | 1966 California acceptable limits (Federal standards for 1968) |
|---|---|---|---|
| CO, percent | 0.97 | 1.10 | 1.5 |
| $CO_2$, percent | 12.50 | 14.2 | |
| HC, p.p.m | 232 | 264 | 275 |
| $NO_x$ | N.D. | | |

Correction factor 1.136.
N.D.—Not determined.

While my present invention has been described with a certain degree of particularity with reference to several specific embodiments, it is to be understood that my invention is not to be limited to the details set forth but rather should be afforded the full scope of the appended claims.

I claim:

1. An auxiliary fuel gasifier system for an internal combustion engine having a combustion chamber and a valved exhaust outlet leading therefrom comprising in combination:
   an induction system for conveying an air-fuel mixture from an air-fuel mixer device to said combustion chamber,
   a conduit providing fluid communication between said exhaust outlet and said induction system for recycling exhaust gas into said induction system downstream from said air-fuel mixer device, and
   means for inducting fuel into said conduit.

2. The system of claim 1 including means for mixing said fuel with air prior to induction into said conduit.

3. The system of claim 1 wherein said air-fuel mixer device is a carburetor and wherein said fuel is inducted from said carburetor into said recycle conduit.

4. An auxiliary fuel gasifier system for an internal combustion engine having a plurality of combustion chambers and valved exhaust outlets leading therefrom comprising, in combination:
   an induction system for conveying an air-fuel mixture to said combustion chambers, said induction system including a plurality of intake ports leading to said combustion chambers,
   a valved passageway in fluid communication with said exhaust outlets,
   a plurality of conduits providing fluid communication between said passageway and said intake ports through which conduits exhaust gas may be recycled to said combustion chambers, and means for inducting fuel into said conduits.

5. The system of claim 4 including means for mixing said fuel with air prior to induction into said conduit.

6. The apparatus of claim 4 wherein said air-fuel mixture is furnished to said induction system by a carburetor and a portion of the fuel from said carburetor is piped to said inducting means.

7. A fuel gasifier system for an internal combustion engine having a plurality of combustion chambers and valved exhaust outlets leading therefrom, comprising in combination:
   an induction system for conveying an air-fuel mixture to said combustion chambers, said induction system including a plurality of intake ports leading to said combustion chambers,
   an air-fuel mixer device supplying an idle fuel portion and a main fuel portion into said induction system,
   a valved passageway in fluid communication with said exhaust outlets,
   a plurality of conduits providing fluid communication between said passageway and said intake ports through which conduits exhaust gas may be recycled to said chambers, and
   means for inducting said idle fuel into said exhaust recycle conduits.

8. A fuel gasifier system for an internal combustion engine having a plurality of combustion chambers and valved exhaust outlets leading therefrom and a carburetor providing an air-fuel mixture to said combustion chambers through a carburetor throttle body and having a throttle valve in said body, comprising in combination:
   (a) an induction system for conveying an air-fuel mixture from said carburetor to said combustion chambers, said induction system including a plurality of intake ports leading to said combustion chambers,
   (b) a conduit in fluid communication with said exhaust outlets,
   (c) means providing fluid communication between said conduit and said induction system for recycling exhaust gas into said induction system,
   (d) a passageway providing fluid communication between said carburetor and said recycle means, said passageway having jet openings therein for supplying idle and off-idle fuel portions to said induction system through said passageway and said recycle means into said exhaust recycle conduit, and
   (e) means for controlling the flow of fuel through said idle and off-idle jets conjointly with said throttle valve.

9. A fuel gasifier system for an internal combustion engine having a plurality of combustion chambers and valved exhaust outlets leading therefrom and a carburetor providing an air-fuel mixture to said combustion chambers through a carburetor throttle body and having a throttle valve in said body, comprising in combination:
   (a) an induction system for conveying an air-fuel mixture from said carburetor to said combustion chambers,
   (b) a conduit in fluid communication with said exhaust outlets,
   (c) means providing fluid communication between said conduit and said induction system for recycling exhaust gas into said induction system,
   (d) a passageway for providing fuel flow from said carburetor and said recycle means,
   (e) said carburetor supplying a main fuel portion into said induction system, an idle fuel portion from a cylinder through idle jet openings in said passageway, and an off-idle portion from said cylinder through off-idle jet openings in said passageway,
   (f) a piston member arranged to move in said cylinder to a position when said cylinder prevents fuel flow through said off-idle jets,
   (g) means for moving said piston from said flow preventing position, and
   (h) means for operating said piston moving means conjointly with said throttle valve.

10. A fuel gasifier system for an internal combustion engine having a plurality of combustion chambers and valved exhaust outlets leading therefrom, comprising in combination:
(a) an induction system for conveying an air-fuel mixture to said combustion chambers,
(b) a carburetor device supplying fuel including idle fuel to said combustion chambers through said induction system and having an accelerator pump mechanism thereon for adding acceleration fuel to said induction system at carburetor accelerations,
(c) a valved passageway in fluid communication with said exhaust outlets for recycling exhaust gas into said induction system, and
(d) means for injecting said acceleration fuel into said recycle passageway.

11. The system of claim 10 including means for inducting said idle fuel into said induction system through said recycle passageway.

12. An auxiliary fuel gasifier system for an internal combustion engine having a combustion chamber and a valved exhaust outlet leading therefrom comprising in combination:
an induction system for conveying an air-fuel mixture to said combustion chamber,
a conduit providing fluid communication between said exhaust outlet and said induction system for recycling exhaust gas into said induction system through a recycle gas distribution means,
means for inducting a portion of the total fuel conveyed into said combustion chamber through said distribution means, and
means for metering said fuel portion with air to atomize said fuel portion prior to induction of said fuel portion into said distribution means.

13. An auxiliary fuel gasifier system for an internal combustion engine having a combustion chamber and a valved exhaust outlet leading therefrom comprising in combination:
an air-fuel mixer device,
a fuel line conveying fuel from a fuel source to said air-fuel mixer device,
an induction system for conveying an air-fuel mixture to said combustion chamber,
a conduit providing fluid communication between said exhaust outlet and said induction system for recycling exhaust gas into said induction system through a recycle gas distribution means,
means for inducting a portion of the total fuel conveyed into said combustion chamber through said distribution means,
means for metering said fuel portion with air and circulating said metered fuel in a chamber arranged and constructed to effect atomization and vaporization of said fuel portion prior to induction of said fuel portion into said distribution means,
said fuel line being in heat exchange relationship with said chamber to effect cooling of said fuel flowing through said fuel line to said mixer device as said fuel portion vaporizes in said chamber.

References Cited
FOREIGN PATENTS
323,642    1/1930    Great Britain.

WENDELL E. BURNS, *Primary Examiner.*